(12) United States Patent
Al Sayeed

(10) Patent No.: US 10,897,321 B1
(45) Date of Patent: Jan. 19, 2021

(54) PROTECTION FOR A DEGREE-TO-DEGREE FIBER LINK IN AN OPTICAL ADD/DROP MULTIPLEXER (OADM)

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/697,365

(22) Filed: Nov. 27, 2019

(51) Int. Cl.
*H04J 14/02* (2006.01)
*H04Q 11/00* (2006.01)

(52) U.S. Cl.
CPC ........ *H04J 14/029* (2013.01); *H04J 14/0204* (2013.01); *H04J 14/0212* (2013.01); *H04Q 11/0066* (2013.01); *H04Q 2011/0081* (2013.01)

(58) Field of Classification Search
CPC .................... H04J 14/029; H04J 14/028–0297
See application file for complete search history.

(56) References Cited

U.S. PATENT DOCUMENTS

| | | | |
|---|---|---|---|
| 9,276,696 B2 | 3/2016 | Al Sayeed et al. | |
| 9,344,191 B2 | 5/2016 | Al Sayeed et al. | |
| 9,485,013 B2 | 11/2016 | Al Sayeed et al. | |
| 9,577,763 B2 | 2/2017 | Al Sayeed et al. | |
| 9,686,599 B2 | 6/2017 | Maamoun | |
| 9,768,902 B2 | 9/2017 | Al Sayeed et al. | |
| 9,806,803 B2 | 10/2017 | Bownass et al. | |
| 9,882,634 B1 | 1/2018 | Al Sayeed et al. | |
| 9,906,294 B2 | 2/2018 | Al Sayeed et al. | |
| 9,918,148 B2 | 3/2018 | Swinkels et al. | |
| 9,985,726 B1 | 5/2018 | Al Sayeed et al. | |
| 9,986,317 B1 | 5/2018 | Al Sayeed et al. | |
| 10,063,313 B1 | 8/2018 | Al Sayeed et al. | |
| 10,237,011 B2 | 3/2019 | Al Sayeed et al. | |
| 10,298,356 B1 | 5/2019 | Châtelain et al. | |
| 10,361,957 B1 | 7/2019 | Mackay et al. | |
| 10,404,401 B1 | 9/2019 | Maamoun et al. | |
| 10,439,709 B1 | 10/2019 | Al Sayeed | |
| 2008/0095537 A1* | 4/2008 | Sakamoto | H04J 14/0291 14/291 |
| 2016/0227303 A1* | 8/2016 | Prakash | H04J 14/021 |
| 2017/0099530 A1* | 4/2017 | Swinkels | H04Q 11/0005 |
| 2019/0007131 A1* | 1/2019 | Satyarthi | G11C 16/12 |
| 2019/0103939 A1 | 4/2019 | Al Sayeed et al. | |
| 2019/0173602 A1 | 6/2019 | Al Sayeed et al. | |

* cited by examiner

*Primary Examiner* — Shi K Li
(74) *Attorney, Agent, or Firm* — Clements Bernard Walker; Lawrence A. Baratta, Jr.; Christopher L. Bernard

(57) ABSTRACT

Systems and methods are provided for enabling degree-to-degree protection within an optical node, such as an Optical Add/Drop Multiplexer (OADM) node or Reconfigurable Optical Add/Drop Multiplexer (ROADM) node. According to an exemplary protection method, a step is executed for configuring two degree-to-degree fiber links between a first degree of the OADM node and a second degree of the OADM node. The method also includes designating a first degree-to-degree fiber link of the two degree-to-degree fiber links as a primary fiber link. Also, the method includes designating a second degree-to-degree fiber link of the two degree-to-degree fiber links as a protection fiber link configured for providing protection if a fiber break is detected on the primary fiber link.

20 Claims, 12 Drawing Sheets

PROTECTION FOR A DEGREE-TO-DEGREE FIBER LINK IN AN OPTICAL ADD/DROP MULTIPLEXER (OADM)

TECHNICAL FIELD

The present disclosure generally relates to optical networking systems and methods. More particularly, the present disclosure relates to spectrum-selective protection schemes for enabling traffic to flow along an alternate fiber link when a break in a primary fiber link is detected.

BACKGROUND

Data traffic flows throughout an optical network based on predetermined paths. At times, such as when an infrastructure fault is detected or when portions of the network are congested, the data traffic may be diverted from a primary path and configured to flow instead through an alternate path, generally through a different set of nodes. Thus, if a link to one node includes some type of fault or experiences unacceptable latency, a protection path may be used as a backup for avoiding the problematic link. Path protection in this sense is typically accompanied by end-to-end control for controlling the routing protocols through various nodes in order to allow a source node to transmit data to a destination node.

FIG. 1 is a block diagram of a portion of an optical network 10 for end-to-end routing from a channel multiplexer 12 of a source node A to a channel demultiplexer 14 of a destination node Z. The optical network 10 may include Optical Add/Drop Multiplexer (OADM) devices for routing from the source node 12 to the destination node 14. For simplicity, the optical network 10 is shown in FIG. 1 as a unidirectional optical network for communicating in one direction from the source node 12 to the destination node 14. However, it should be recognized that communication may normally be bi-directional within a network, having a corresponding set of equipment for this opposite direction.

In the optical network 10 of FIG. 1, each node A, B, C, Z, E, D includes at least one OADM demultiplexer 16 and at least one OADM multiplexer 18. One or more amplifiers 20 are disposed between the nodes for optically amplifying the signals as needed when the signals are transmitted from one node to the next. Also, each node includes a number of degrees that allow connection to neighboring nodes. For example, node C include four degrees for communication with node B, node E, node D, and node Z.

The end-to-end path from the source node 12 to the destination node 14 may include one or more photonic services running through a primary path from node A to node Z along the path comprising nodes A-B-C-Z. In addition to the primary path (A-B-C-Z), the end-to-end path may also include one or more protection (or alternative) paths for use in the event that a fault is discovered somewhere along the primary path. Thus, the photonic services can be managed and mesh-protected in Layer 0 (L0) using a Layer 0 Control Plane (L0CP). In the Open Systems Interconnection (OSI) model, L0 may refer to the optical infrastructure, such as the fiber optic cables, used for transmitting data. L0CP can be running on Layer 0 on the various Network Elements (NEs) or externally on a higher layer controller. Controlling the infrastructure on Layer 0, the L0CP may be referred to as an intelligent optical control plane implemented in software that controls the configuration of connections between optical switches across a network. Thus, in FIG. 1, a L0CP may be used to control the OADM switches at the nodes A, B, E, C, D, Z to route traffic from the source node 12 to the destination node 14 within this specific portion 10 of the network.

For a given set of services, the primary path (or working path), as mentioned above, is A-B-C-Z. Viable protection paths in the illustrated implementation may include a first protection (or alternative) path A-E-C-Z, a second protection path A-B-C-D-Z, and a third protection path A-E-C-D-Z.

FIG. 2 also shows the optical network 10. However, in this example, an internal fault 24 is detected within node C. More particularly, the fault is a degree-to-degree fault between one of the OADM demultiplexers 16 (at the degree for communication with node B) and one of the OADM multiplexers 18 (at the degree for communication with node Z). For example, the detected fault may be the result of a cut or break in the degree-to-degree optical fiber between components 16 and 18. This is an intra-node fault.

Normally, in a situation such as the one shown in FIG. 2 where a degree-to-degree fiber break occurs, the conventional L0CP (running in Layer 0 or in a higher layer) detects the channel fault via a receiver in node C. The receiver may detect a Loss of Signal (LOS), Loss of Frame (LOF), Loss of Clock (LOC), or other type of fault. In response to a detected fault, a restoration is triggered for the L0 service. Depending on where the fault is detected, the system is able to route traffic through an alternative protection path to allow data to continue to flow from the source node 12 to the destination node 14.

If the fault location is known to be in the head-end or tail-end of the primary path, the L0CP can then choose new restoration routes to avoid the faulted link(s). L0CP will avoid the faulted degree-to-degree link and will find an alternate path avoiding that link. In this case, the available restoration paths can be any one of: (1) A-E-C-Z; (2) A-B-C-D-Z; or (3) A-E-C-D-Z.

If the fault location is not known to be in the head-end or tail-end, the L0CP, due to communication issues between the intermediate nodes or shelves, may then trigger restoration on a complete diverse route than the existing primary route. For example, the available restoration path in this case may be A-E-C-D-Z. In either case, the control plane L0CP relies on end-to-end communications to delete the faulted channels from their existing path, compute new viable paths, and then restore the services on the new path.

FIG. 3 also shows the optical network 10, whereby faults are detected at different locations within the network. In the condition of the optical network 10 as shown in FIG. 3, a first fault 28 is detected between the OADM demultiplexer 16 and the OADM multiplexer 18 within node D. A second fault 30 is detected between one of the OADM demultiplexers 16 and the OADM multiplexer 18 within node Z. Also, a third fault 32 is detected along the link between node D and node Z. Again, the detected faults may be the result of a cut or break in the optical fiber.

In this situation, the L0CP may use tail-end switching, where a Wavelength Selective Switching (WSS) switch port at the Directionally Independent Access (DIA) point at the drop/tail can be configured to switch from one degree port to another when a loss of signal is detected for one port. In such case, protection may be made between two different degrees via other available degree connections. For example, at a minimum, the configuration may require three-degree connections (e.g., two Reconfigurable OADM (ROADM) degrees combined with a DIA drop, or a three degree ROADM node) so that fiber fault in one degree connection can be protected by another degree connection. Also, channels to be protected need to be broadcast in both available paths so that when a switch takes place at the WSS, the signal is readily available for the receiver. This conventional method provides protection-based local fault detection (e.g., LOS on switch port) and there is therefore no need to communicate with the L0CP.

FIG. 4 also shows the optical network 10 with other detected faults. In this situation, the L0CP may use span switching, which includes degree switching at an intermediate ROADM site. A first fault 36 is detected between the OADM demultiplexer 16 and the OADM multiplexer 18 within node B. A second fault 38 is detected between one of the OADM demultiplexers 16 and the one of the OADM multiplexers 18 within node C. A third fault 40 is detected between nodes B and C.

In such case, protection is made between two different degrees via other available degree connections. For example, at a minimum, the configuration may require three-degree connections so that a fiber fault in one degree connection can be protected by another degree connection. Channels to be protected need to be broadcast in both available paths so that when a switch takes place at the WSS, the signal is readily available for the receiver. The conventional method provides protection-based local fault detection (e.g., LOS on switch port) and therefore there is no need to communicate with the L0 control plane.

Even though the conventional path protection strategies are beneficial in many respects, these strategies may also occasionally suffer from various shortcomings. Also, existing L0CP solutions for handling degree-to-degree fiber faults may experience certain issues. First, end-to-end communications may require every Optical Multiplex Section (OMS) and in-between shelves along the path to know the status of the other OMSs. For example, the head-end node (or originating node) may need to know the status at the tail. Also, the head-end or tail-end L0CP nodes need to know the status of each OMS link as well as the status of all intra-degree fiber links (e.g., objects that represents degree-to-degree physical fiber connections). If there are communication issues anywhere on the long chain of multi-level links, the originating L0CP nodes may fail to get the fault or link status notifications and therefore cannot react autonomously for a mesh-restoration.

A second issue with conventional path protection is that L0 restoration and recovery may take an undesirably long time. In L0, when a degree fault (e.g., loss of optical power) in a sub-set of channels is detected, the deleting/re-provisioning/re-routing process that happens upstream to the detected fault in the photonics control may still need to respect the physical constraints to avoid any service affecting operation for channels running on those upstream OMSs. The non-service affecting delete operation usually takes time that typically spans over tens of seconds per OMS.

A third issue with conventional path protection is the possibility that there might not be any working routes available. Because of the broken degree-to-degree fiber link, the working path remains unavailable for any new or old services until a physical fix is put in place. This means that even if the working path has the best available link budget margin (e.g., to enroll higher capacities), it cannot be used until the fault is fixed. That is, an alternate restoration route must be picked up even if this means that the overall capacity must be dialed down temporarily.

In some cases, conventional strategies may be used for span-switching or tail-end switching. Tail-end or span-switching techniques suffer from the following limitations. First, a one-degree node may be protected by deploying another ROADM degree. This may be an expensive solution for adding new path and degree equipment. Also, channels may need to be broadcast in both protected paths and the spectral-slot may need to be reserved in both paths.

Another disadvantage is that the conventional methods may only work for Broadcast & Select (B&S) based ROADM architecture, where the optical signal can be broadcast at the transmit direction and selected at the receive direction. If either ingress or egress contains a Route & Select (R&S) ROADM architecture that contains WSS for both the transmit and receive direction, the method simply cannot work without messaging all the way to the head-end to switch. Even then, this will cause a large transient along the protection path for other in-service channels.

Also, the conventional strategies cannot differentiate where a fiber break takes place. Any channel LOS or port LOS caused by a fiber fault anywhere in the path will cause the WSS to switch. Furthermore, for the conventional strategies, both protected paths need to be of similar distance from a link budget and fiber chromatic dispersion point of view. Otherwise, it may consume a longer time to re-acquire traffic following a switch in DIA WSS.

Therefore, there is a need in the field of optical networks to provide protection in a manner that overcomes the above-noted deficiencies of the conventional restoration strategies.

BRIEF SUMMARY

The present disclosure is directed to various systems and methods for enabling degree-to-degree protection within an Optical Add/Drop Multiplexer (OADM) node or Reconfigurable Optical Add/Drop Multiplexer (ROADM) node. The degree-to-degree protection supports local protection against intra-degree faults in an OADM or ROADM node. That is, the local protection supports local 1+1 switching when there is an intra-degree fault instead of a switch between nodes, a switch utilizing a control plane, involvement of the source node, etc. According to one implementation, a local controller configured to provide control signals to an OADM node is disclosed. The local controller may include a processing device and a memory device configured to store a local switch control module. The local switch control module may include logic instructions which, when executed, cause the processing device to configure a plurality of degree-to-degree fiber links between a first degree of the OADM node and a second degree of the OADM node. The logic instructions further cause the processing device to designate a first degree-to-degree fiber link of the plurality of degree-to-degree fiber links as a primary fiber link. Also, the processing device is configured to designate at least a second degree-to-degree fiber link of the plurality of degree-to-degree fiber links as one or more protection fiber links configured for providing protection if a fiber break is detected on the primary fiber link.

According to another implementation, a non-transitory computer-readable medium configured to store computer logic is described in the present disclosure. The computer logic may include instructions that, when executed, cause one or more processing devices to configure, in an OADM node, two degree-to-degree fiber links between a first degree of the OADM node and a second degree of the OADM node. The instructions also cause the one or more processing devices to designate a first degree-to-degree fiber link of the two degree-to-degree fiber links as a primary fiber link. Also, a second degree-to-degree fiber link of the two degree-to-degree fiber links is designated as a protection fiber link configured for providing protection if a fiber break is detected on the primary fiber link.

According to a yet another implementation, a protection method may include a step of configuring two degree-to-degree fiber links between a first degree of the OADM node and a second degree of the OADM node. The method also includes designating a first degree-to-degree fiber link of the two degree-to-degree fiber links as a primary fiber link. Also, the method includes designating a second degree-to-degree fiber link of the two degree-to-degree fiber links as a protection fiber link configured for providing protection if a fiber break is detected on the primary fiber link.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 8A shows the original configuration of the node for communication along the primary fiber path, and whereby FIG. 8B shows an alternate configuration of the node for communication along a protection fiber path to avoid the fiber break on the primary fiber path, according to various embodiments;

FIG. 9A shows the original configuration of the node for communication along the primary fiber path, and whereby FIG. 9B shows an alternate configuration of the node for communication along a protection fiber path to avoid the fiber break on the primary fiber path, according to various embodiments;

DETAILED DESCRIPTION

Figure 1:
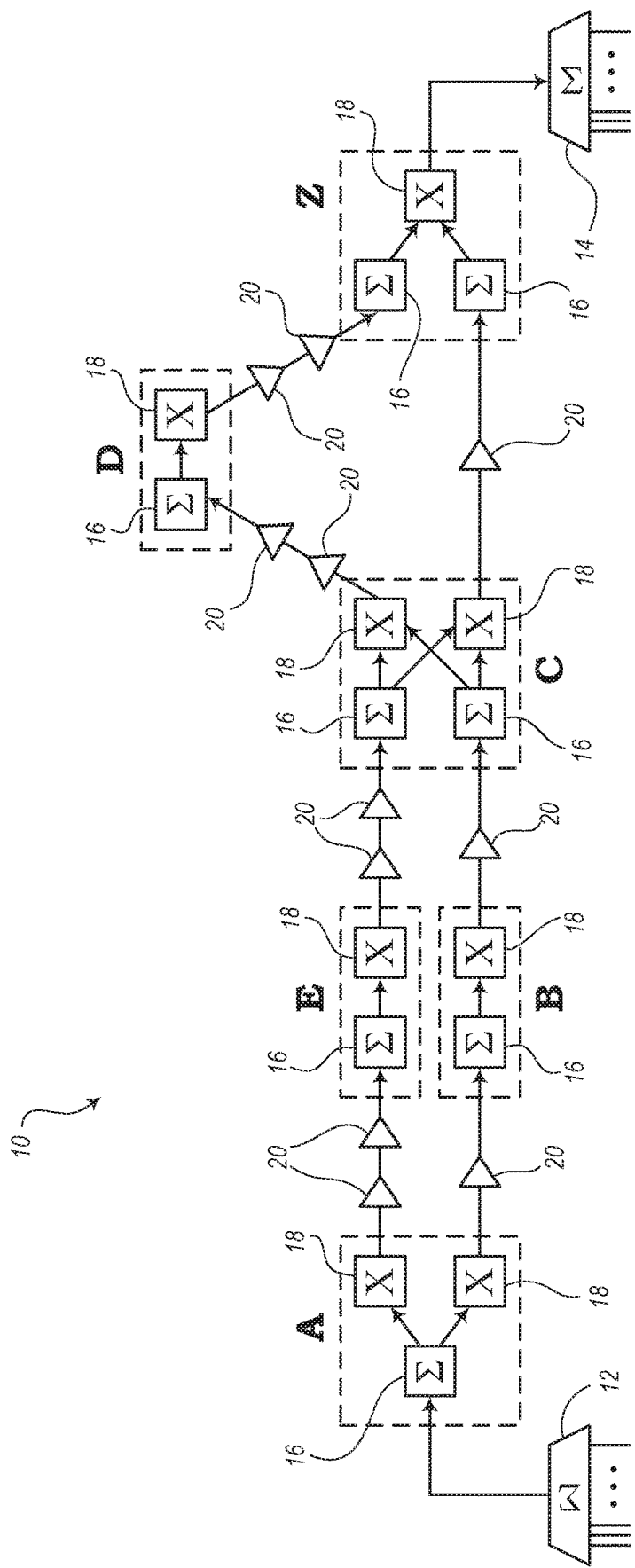
FIG. 1 is a schematic diagram illustrating a conventional optical network.
Figure 2:
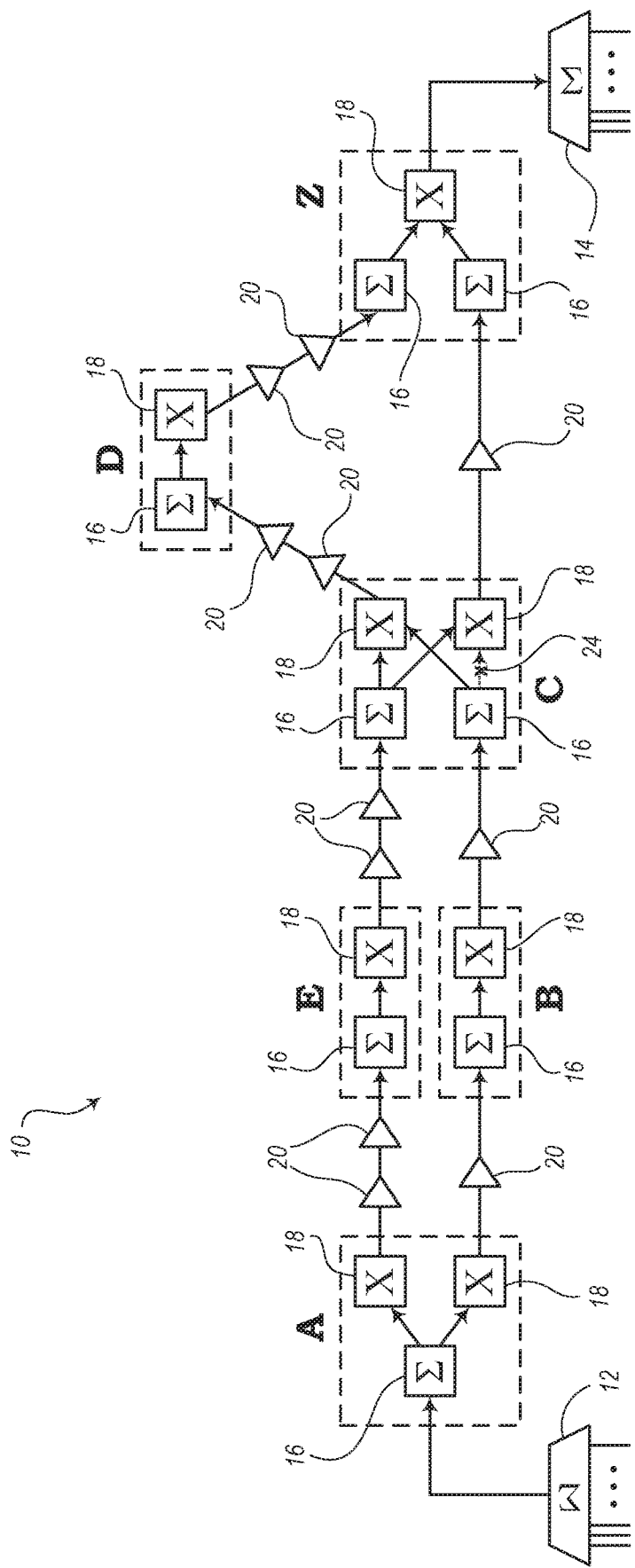
FIG. 2 is a schematic diagram illustrating the conventional optical network of FIG. 1 in which a fault is detected.
Figure 3:
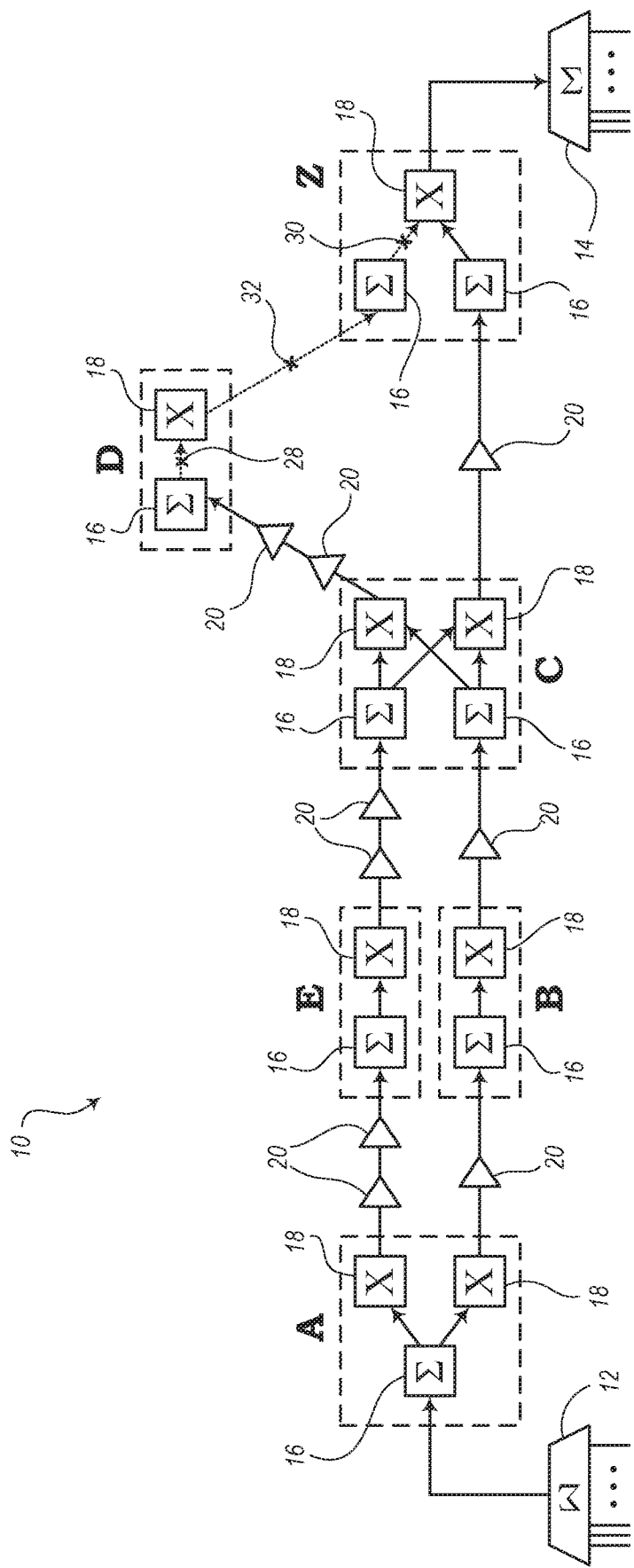
FIG. 3 is a schematic diagram illustrating the conventional optical network of FIG. 1 in which another set of faults is detected.
Figure 4:
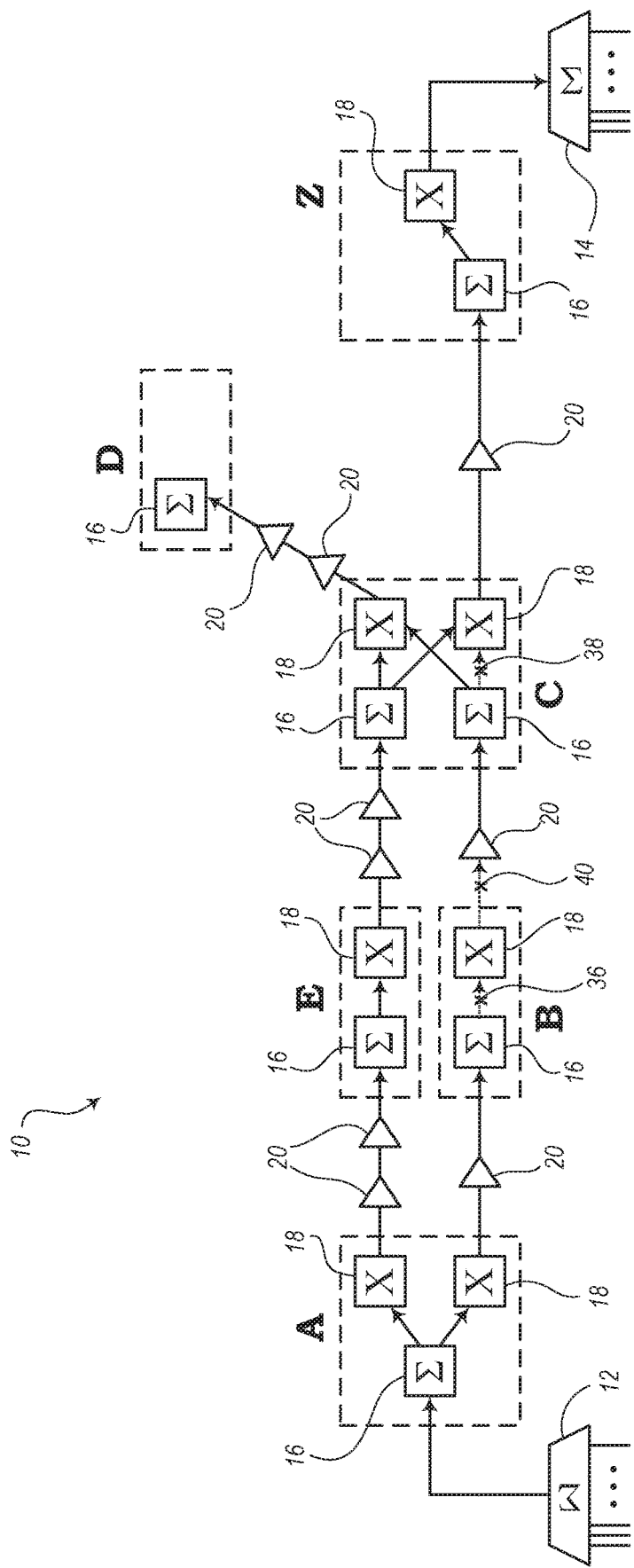
FIG. 4 is a schematic diagram illustrating the conventional optical network of FIG. 3 in which additional faults are detected.

The present disclosure relates to systems and methods for providing path protection for an optical network to protect against intra-degree faults in an OADM or ROADM node. However, instead of providing end-to-end path protection as is common with conventional systems, the embodiments of the present disclosure are configured to provide path protection on a local level, when possible, without requiring re-routing through alternative nodes. By dedicating two or more redundant fiber cables for a local link or connection from one degree of a node to another degree of the node, it is possible to route traffic through a primary fiber (or primary fiber pair) during normal operation. However, if a fault is detected in one or both of the fibers of this primary fiber link pair, for degree-to-degree connectivity, another one of the redundant fibers may be used as a protected path for avoiding the faulty link. Normally, path protection (e.g., channel protection, link protection, segment routing protection, etc.) in an optical network is an end-to-end protection scheme involving multiple nodes of the system.

In the past, conventional Optical Add/Drop Multiplexing (OADM) devices and Reconfigurable Optical Add/Drop Multiplexing (ROADM) devices had fewer ports (e.g., nine ports). All these ports were normally used for degree connections to other nodes. Now, OADM devices and ROADM devices may have as many as 32 ports or more. Therefore, there are now many more ports available. Although the conventional use for the ports is for communication with other nodes, the embodiments of the present disclosure utilize the ports for local path protection. Particularly, the present embodiments use redundant or duplicate degree-to-degree connections within a node. Before, any preventative protection involved choosing a different path through different nodes, as explained above with respect to FIGS. 1-4. Also, this process involved using an engine control plane and end-to-end messaging for controlling all the nodes along the various paths.

In contrast, the present disclosure describes local control to switch from a primary link to one or more alternate links between the degrees of a single node. Therefore, if there is a fiber break within a node between any of the degrees of the node, then a local controller can switch to one of the alternate links for sending traffic. In this way, the primary path through a node can be maintained without the need to divert traffic along an alternate protection path through alternate nodes. There is no re-routing through an alternate path, but instead the present embodiments include switching to a redundant or duplicate link between two degrees of a node for providing protection on a local (intra-node) level.

The nodes may include Wavelength Selective Switches (WSSs) or ROADMs connected at the edges of the various degrees, where the degrees are configured for connection with other neighboring nodes. Since the current WSSs have a greater number of ports than may be needed for connection to other nodes, the present disclosure defines strategies for utilizing these extra ports in a protection scheme if a degree-to-degree fault is detected. The protection in the present disclosure may also be referred to as a port-to-port protection scheme for creating redundant links between the ports of one degree of a node and the ports of another degree of the node.

The node can also be configured such that a degree fiber that shares a specific part of the spectrum can be protected when the fiber is configured from one degree to another. To protect this degree fiber, the local controller can be used to provide protection by allocating or configuring an additional protection fiber between the two degrees. The controller can "burn" one of the extra switch ports to provide this type of protection. The local controller does not rely on engine control planes or inter-node messaging to enable this protection but may be executed locally within the node itself.

As part of the local degree-to-degree fiber link protection, the present embodiments can further be configured in a spectrum-selective manner. In other words, if the degree-to-degree fibers are allocated for transmitting specific channels or wavelengths of the spectrum, then a spectrum-selective protection can be provided for certain fibers that carry certain channels. Thus, a network administrator can allocate protection fibers to protect specific parts of the spectrum that may require a higher reliability and can decide to not protect other parts of the spectrum if those channels are not as high of a priority.

The local degree-to-degree protection can run on top of other end-to-end path protection schemes in place. For example, if the local degree-to-degree protection is able to work around any fiber break within the node, then the traffic through the end-to-end path may not experience any difference since the same route through a primary end-to-end path can be maintained. Therefore, the degree-to-degree protection described in the present disclosure can be a first protection scheme that is enacted to avoid a faulty fiber. Otherwise, if the degree-to-degree protection is not able to solve the issue, then the traditional end-to-end path protection can be used. Of course, by resorting to the traditional protection methods, the traffic may experience greater latency and other negative consequences.

The embodiments of the present disclosure focus on layer 0 (optical fiber) restoration against a fiber break for a degree-to-degree fiber connection. More specifically, the present disclosure describes a 1+1 protection scheme for a degree-to-degree fiber connection by dedicating two switch ports of an OADM multiplexer and OADM demultiplexer for the same degree-to-degree link. Thus, the present disclosure provides a local protection solution without any end-to-end communication or end-to-end controlling as is normally done with path protection. Also, the embodiments of the present disclosure are independent of any network level layer 0 control plane controlling.

As a result of local protection strategies described herein, faulted channels can be restored quickly and without significant network impact. The channel may be a subset of all the channels in an optical section that are affected by a degree fiber break. Also, the present solution is able to restore the steady-state offsets on other in-service channels (that are coming from other degrees or locally added downstream to the fault) in a matter of seconds. The embodiments of the present disclosure can also preserve all the link budget benefits of a working path by providing a quick switch from one-degree fiber to the next, and thereby keeping the channels on their planned working path without having to resort to alternate paths as is done in conventional systems. The present embodiments, on the other hand, can maintain the same margin benefits (if any). In addition, by working locally, the present embodiments are able to hide the complexity of modelling a degree-to-degree fiber link in an end-to-end LOCP. That is, the protection happens locally and remains unchanged/uninterrupted to higher layer control planes.

Although the methods of the present disclosure include "burning" an extra port for each degree protection, this extra port allows the flexibility of protecting traffic from one degree or plurality of degrees in a nodal connection using existing OADM switching elements (e.g., WSS elements) and does not require any external hardware protection such as optical protection switching (OPS) elements.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Figure 5:
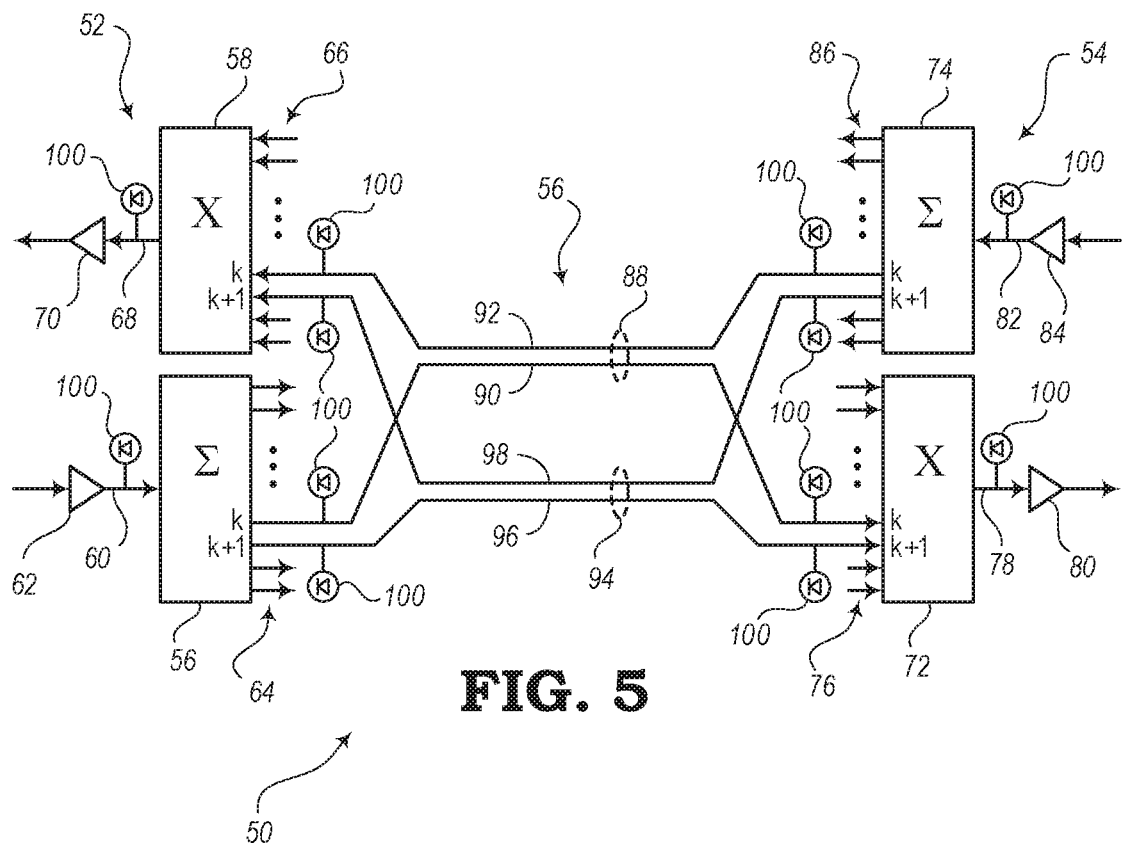
FIG. 5 is a schematic diagram illustrating a node of an optical network, whereby the node is arranged in a Broadcast and Select (B&S) configuration to enable degree-to-degree protection within the node, according to various embodiments of the present disclosure.

FIG. 5 is a block diagram illustrating an embodiment of a node 50 of an optical network. The node 50 in this embodiment includes a west degree 52 and an east degree 54, where each degree 52, 54 is configured for communication with a neighboring node in the optical network. As shown in FIG. 5, the node 50 is configured for bi-directional communication such that ingress traffic is received and egress traffic is transmitted at each degree for transmitting optical signals to the neighboring node associated with that degree and for receiving optical signals from the neighboring node.

The west degree 52 includes a pair of Wavelength Selective Switches (WSSs), including an Optical Add/Drop Multiplexer (OADM) demultiplexer 56 (or splitter) and an OADM multiplexer 58 (or combiner). The OADM demultiplexer 56 includes an input port 60 for receiving signals via an amplifier 62 from a first neighboring node and a plurality of output ports 64. According to various embodiments, the OADM demultiplexer 56 may include any number of output ports 64 (e.g., 32 ports). Based on different configurations (e.g., as controlled by a controller as described in more detail below), the optical signals on each of the output ports 64 may be dropped (removed) or may be allowed to pass through the node 50 and forwarded to the east degree 54.

The OADM multiplexer 58 of the west degree 52 includes a plurality of input ports 66 and an output port 68 that supplies optical signal to the first neighboring node via an amplifier 70. Similar to the OADM demultiplexer 56, the OADM multiplexer 58 of the west degree 52 may include any number of input ports 66 (e.g., 32 ports). The node 50 may add optical signals to some of the input ports 66 while other optical signals may be passed through the node 50 from the east degree 54.

The east degree 54 includes a similar arrangement of WSSs as included in the west degree 52. For example, the east degree 54 also includes an OADM multiplexer 72 (or combiner) and an OADM demultiplexer 74 (or splitter). The OADM multiplexer 72 includes any number of input ports 76 (e.g., 32 ports). The node 50 may add optical signals to some of the input ports 76 of the OADM multiplexer 72 while other optical signals may be passed through the node 50 from the OADM demultiplexer 56 at the west degree 52 to other input ports 76. The OADM multiplexer 72 also includes an output port 78 that passes signals to a second neighboring node via an amplifier 80.

The OADM demultiplexer 74 at the east degree 54 receives optical signals on an input port 82. The signals are received from the second neighboring node via another amplifier 84. The OADM demultiplexer 74 also includes any number of output ports 86 (e.g., 32 ports). Some optical signals from some of the output ports 86 may be dropped while others may be allowed to pass through the node 50 to the OADM multiplexer 58 at the west degree 52.

Normally, a single fiber may be allocated for forwarding a specific channel (or wavelength) of the spectrum from one degree to another. For example, in the embodiment shown in FIG. 5, a network operator may normally allocate a single fiber pair 88 between the west degree 52 and the east degree 54. The fiber pair 88 may include one fiber 90 for transmitting optical signals from the OADM demultiplexer 56 at the west degree 52 to the OADM multiplexer 72 at the east degree 54. The fiber pair 88 may also include another fiber 92 for transmitting optical signals from the OADM demultiplexer 74 at the east degree 54 to the OADM multiplexer 58 at the west degree 52. The fiber pair 88 may be associated with a specific port (e.g., a $k^{th}$ port) of the groups of ports 64, 66, 76, 86 of the respective WSSs at each degree 52, 54.

However, according to the embodiments of the present disclosure, a second fiber pair 94 may be allocated or dedicated for communication of the same channel of the spectrum between the two degrees 52, 54. This fiber pair 94 is considered to be a redundant fiber pair for allowing communication if a fiber break is detected on the first or second fibers 90, 92 of the first fiber pair 88. More particularly, the second fiber pair 94 includes one fiber 96 for transmitting optical signals from the OADM demultiplexer 56 at the west degree 52 to the OADM multiplexer 72 at the east degree 54. The fiber pair 94 may also include another fiber 98 for transmitting optical signals in the opposite direction from the OADM demultiplexer 74 at the east degree 54 to the OADM multiplexer 58 at the west degree 52. For example, the fiber pair 94 may be associated with another port (e.g., a $(k+1)^{th}$ port) of the groups of ports 64, 66, 76, 86 of the respective WSSs at each degree 52, 54.

It should be noted that the node 50 may be arranged such that the west degree 52 is in a different location from the east degree 54. For example, the west degree 52 may be located in one building, while the east degree 54 may be located in a different building. In some cases, the node 50 may be arranged with degrees 52, 54 separated by several miles. Thus, the fiber pairs 88, 94 may be routed between the west degree 52 and east degree 54 along different physical paths. For instance, one fiber pair 88 may be routed along a road and the other 94 may be routed next to a railroad track. Therefore, if a fiber break is detected in one fiber (or in one fiber pair), then the other fiber pair may be used as a backup for protection of this degree-to-degree communication.

With this arrangement of duplicate degree-to-degree fiber pairs, degree-to-degree protection can be established for the specific channel in the node 50. The embodiment of FIG. 5 may be configured in a Broadcast and Select (B&S) architecture, also referred to as a "1+1" arrangement. In this respect, the OADM demultiplexer 56 on the west degree 52 can broadcast the optical signals on both fiber pairs 88, 94 (i.e., along fibers 90 and 96, respectively) to the $k^{th}$ and $(k+1)^{th}$ ports 76 of the OADM multiplexer 72 at the east degree 54. Similarly, the OADM demultiplexer 74 at the east degree 54 can broadcast the optical signals on both fiber pairs 88, 94 (i.e., along fibers 92 and 98, respectively) to the $k^{th}$ and $(k+1)^{th}$ ports of the OADM multiplexer 58 at the west degree 52.

A local controller (as mentioned in more detail below) may be configured to originally switch the OADM multiplexers 72, 58 such that they are receiving the channel signals along one fiber pair (i.e., a primary fiber pair). For example, the OADM multiplexers 72, 58 may be originally switched to their respective $k^{th}$ ports to receive signals along the first fiber pair 88. This may be considered to be the primary degree-to-degree fiber pair. Then, if a fiber break is detected on this primary fiber pair, the local controller may switch the OADM multiplexers 72, 58 to receive the channel signals along the other pair (i.e., a protection or backup fiber pair). For example, the OADM multiplexers 72, 58 may be switched from the primary port to their respective backup port (e.g., the $(k+1)^{th}$ port) to utilize the protection path.

Therefore, with the B&S architecture, the OADM demultiplexers 56, 74 are configured to broadcast on both fiber pairs and the corresponding OADM multiplexers 72, 58 are configured to be switched to one of the fiber pairs on which the signals can be received. According to some embodiment, the B&S arrangement may further include more than one duplicate fiber pair used for protection. In other words, there may be greater than two fiber pairs configured for communicating a channel of a spectrum. Accordingly, one fiber pair may be designated as a primary pair, then another fiber pair may be designated as a first backup (protection) pair, and then yet another fiber pair may be designated as second backup pair, and so on, for as many backup pairs as are configured.

Furthermore, the node 50 may include any number of sensors 100 for detecting if signals are present on specific fibers. Although multiple sensors 100 are shown in FIG. 5, it should be noted that fewer sensors 100 may be needed to detect whether a signal that is intended to be transmitted from one of the OADM demultiplexers 56, 74 to one of the OADM multiplexers 72, 58 is actually present on the fiber. The sensors 100 may be arranged at the input ports and/or output ports of any of the WSS elements 56, 58, 72, 74 in any suitable combination. When one of the sensors 100 detects a fiber break (or other fault) on a primary fiber pair, the WSS elements 56, 58, 72, 74 can be switched to the protection fiber pair for backup transmission.

Figure 6:
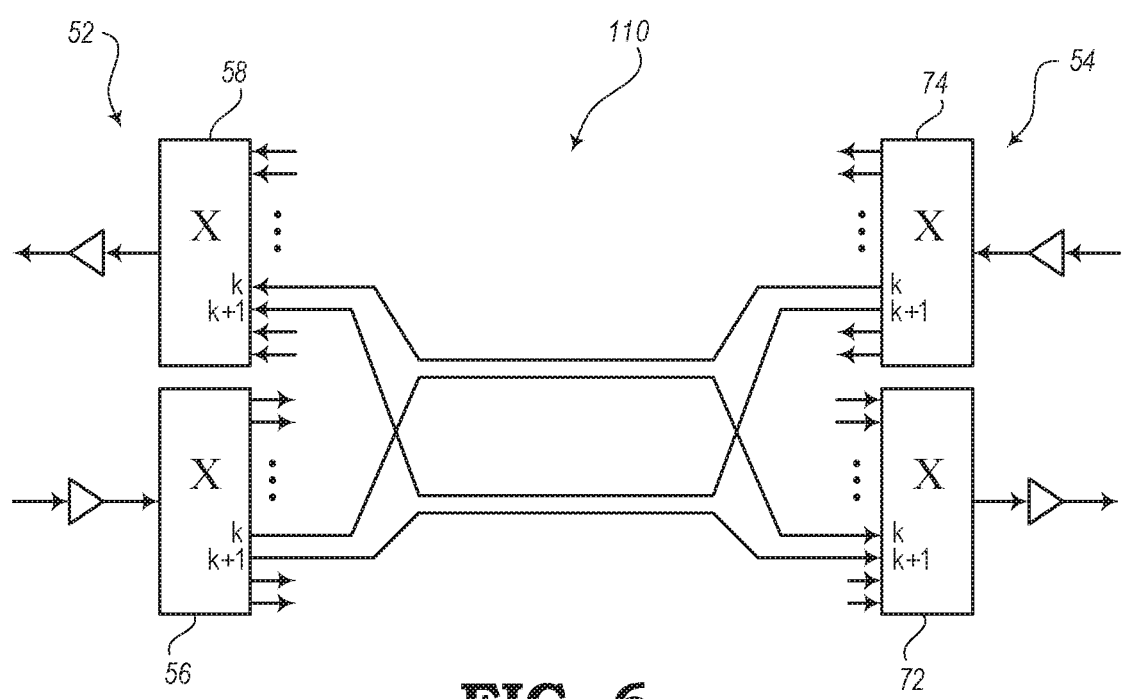
FIG. 6 is a schematic diagram illustrating a node of an optical network, whereby the node is arranged in a Route and Select (R&S) configuration to enable degree-to-degree protection within the node, according to various embodiments of the present disclosure.

FIG. 6 is a block diagram illustrating a node 110 similar to the node 50 of FIG. 5. However, instead of being configured in a B&S arrangement, the node 110 includes a Route and Select (R&S) architecture, also known as a "1:1" arrangement. In this respect, both the OADM demultiplexer and corresponding OADM multiplexer are configured to switch to corresponding ports (and fiber pairs). In FIG. 6, the OADM demultiplexers and OADM multiplexers are shown with the symbol "X" to designated that the Wavelength Selective Switching (WSS) feature of switching on each element is performed at both ends.

By implementing the nodes 50, 110 as described above with respect to FIGS. 5 and 6, the systems bring the 1+1 protection concept for a degree-to-degree fiber link using existing hardware (e.g., OADM elements) and avoid the need for external protection hardware, such as optical protection switches (OPSs). In other words, in a 1+1 scheme, the protection switching is achieved using existing mux/demux WSS switches by a burning extra switch port for a given degree.

In addition, the presently disclosed systems bring the concept of spectral-selective 1+1 protection for a given fiber using protection between WSS-WSS degrees. A selective part of the spectrum on any given fiber can be protected. This is an improvement over conventional systems which include the process of broadband switching using OPS.

Therefore, the systems and method of the present disclosure include the concept of local control to provide L0 restoration on a degree fiber break without any dependency on end-to-end controllers or end-to-end communications. The embodiments of the present disclosure provide resiliency between two degrees using a local controller regardless of the presence of a layer 0 control plane.

The present systems configure protection for a degree-to-degree fiber connection by provisioning at least two fiber pairs for the given degree connection. This allows to dedicate two mux/demux switch ports to carry on express traffic from a given upstream degree, where the upstream degree demux can be broadcast or can have a route and select architecture. If there is a fiber cut on one of the degree fiber connections for a given direction (east or west), all traffic from the degree-to-degree fiber link can be switched locally to the other protection fiber link.

The nodes 50, 110 are illustrated as two-degree 52, 54 nodes for illustration purposes, and those skilled in the art will recognize more degrees are also contemplated. The nodes 50, 110 can be located at central offices (CO), data centers (DC), and the like. In an embodiment, the degrees 52, 54 can be located in the same physical location, and the degree-to-degree fiber break can be a cut or disconnection of a fiber connector within the same physical location. In another embodiment, the degrees 52, 54 can be located in different locations, including separated by several hundred meters or several kilometers. Such an embodiment may be in a metro or regional network, such as for a data center. Here, the degree-to-degree fiber break can be a fiber cut over the several hundred meters or several kilometers. Other embodiments are also contemplated.

Figure 7:
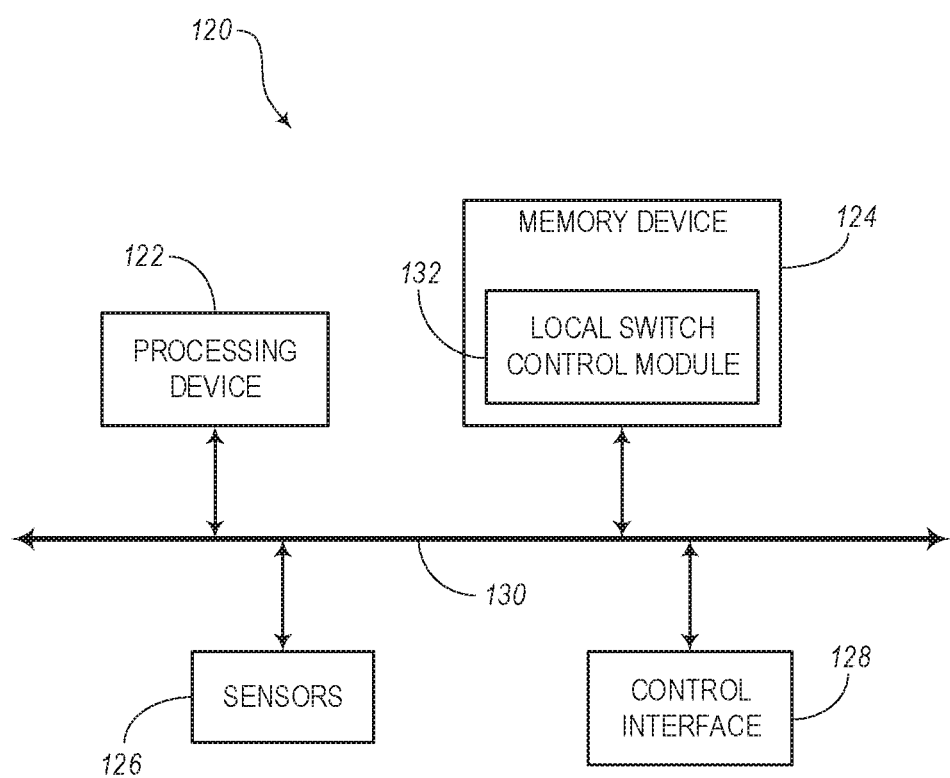
FIG. 7 is a block diagram illustrating a local controller for switching a network element between a primary fiber path and a protection fiber path in response to a fiber break, according to various embodiments of the present disclosure.

FIG. 7 is a block diagram illustrating an embodiment of a local controller 120 for switching the WSS elements 56, 58, 72, 74 of the nodes 50, 110 of FIGS. 5 and 6, depending on the B&S or R&S arrangement of the respective node. As mentioned above, the local controller 120 can originally switch the OADM demultiplexers 56, 74 (in the R&S arrangement) and the OADM multiplexers 72, 58 (in both the B&S and R&S arrangements) such that these WSS elements are configured to communicate along a first fiber pair (i.e., a primary fiber pair), such as fiber pair 88. The local controller 120 can then receive signals from the sensors 100 to determine if the primary fiber pair includes a fiber break. If so, the local controller 120 switches the OADM demultiplexers 56, 74 (in the R&S arrangement) and the OADM multiplexers 72, 58 (in both the B&S and R&S arrangements) such that these WSS elements are configured to communicate along an alternate fiber pair (i.e., a protection or backup fiber pair). In some cases, there may be more than one protection or back fiber pair, and, as such, the local controller 120 may include a strategy for resorting to the protection fibers in a particular order to provide multiple layers of protection.

As illustrated in FIG. 7, the local controller 120 includes a processing device 122, a memory device 124, sensors 126, and a control interface 128. These elements 122, 124, 126, 128 may be interconnected via a local interface 130 or bus. The memory device 124 may be configured to store a software program, such as a local switch control module 132. In the present disclosure, the local switch control module 132 may allow the processing device 122 to perform the various switching actions described through the present disclosure. For example, the local switch control module 132 may include instructions or computer logic for designating a primary fiber pair for a preferred communication path between one degree of a node and another. The local switch control module 132 may also receive input from the sensors 126, which may be configured to detect whether optical signals are present on the active fibers. If the local switch control module 132 determines that optical signals are not detected on a particular fiber, then the local switch control module 132 may be configured to cause the processing device 122 to switch the WSS elements such that they communicate along a protected fiber pair. The control interface 128 may be configured to provide switching instruction to each of the respective WSS elements 56, 58, 72, 74 of the nodes 50, 110.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the embodiment illustrated in FIG. 7, the local controller 120 may be a digital computer that, in terms of hardware architecture, generally includes the processing device 122, the memory device 124, the sensors 126 (and/or other input/output (I/O) devices), and the control interface 128 (and/or a network interface). The memory device 124 may include a data store, database, or the like. It should be appreciated by those of ordinary skill in the art that FIG. 7 depicts the local controller 120 in a simplified manner, where practical embodiments may include additional components and suitably configured processing logic to support known or conventional operating features that are not described in detail herein. The components (i.e., 122, 124, 126, 128) are communicatively coupled via the local interface 130. The local interface 130 may be, for example, but not limited to, one or more buses or other wired or wireless connections. The local interface 130 may have additional elements, which are omitted for simplicity, such as controllers, buffers, caches, drivers, repeaters, receivers, among other elements, to enable communications. Further, the local interface 130 may include address, control, and/or data connections to enable appropriate communications among the components 122, 124, 126, 128.

The processing device 122 is a hardware device adapted for at least executing software instructions. The processing device 122 may be any custom made or commercially available processor, a central processing unit (CPU), an auxiliary processor among several processors associated with the local controller 120, a semiconductor-based microprocessor (in the form of a microchip or chip set), or generally any device for executing software instructions. When the local controller 120 is in operation, the processing device 122 may be configured to execute software stored within the memory device 124, to communicate data to and from the memory device 124, and to generally control operations of the local controller 120 pursuant to the software instructions.

It will be appreciated that some embodiments of the processing device 122 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 122 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The sensors 126 may be configured as sensor interfaces for connection with sensors imbedded within the node 50, 110. Other I/O interfaces may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The control interface 128 (or network interface) may be used to enable the local controller 120 to communicate with a local node or with multiple nodes over a network, such as an optical network, the Internet, a wide area network (WAN), a local area network (LAN), and the like, on which the node 50, 110 operates. The control interface 128 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The interface 128 may include address, control, and/or data connections to enable appropriate communications on the optical network 10.

The memory device 124 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 124 may incorporate electronic, magnetic, optical, and/or other types of storage media. The memory device 124 may have a distributed architecture, where various components are situated remotely from one another, but can be accessed by the processing device 122. The software in memory device 124 may include one or more software programs, each of which may include an ordered listing of executable instructions for implementing logical functions. The software in the memory device 124 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 124 may include a data store used to store data. In one example, the data store may be located internal to the local controller 120 and may include, for example, an internal hard drive connected to the local interface 130 in the local controller 120. Additionally, in another embodiment, the data store may be located external to the local controller 120 and may include, for example, an external hard drive connected to the I/O interfaces (e.g., SCSI or USB connection). In a further embodiment, the data store may be connected to the local controller 120 through a network and may include, for example, a network attached file server.

Moreover, some embodiments may include a non-transitory computer-readable storage medium having computer readable code stored in the memory device 124 for programming the local controller 120 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 122 that, in response to such execution, cause the processing device 122 to perform a set of operations, steps, methods, processes, algorithms, functions, techniques, etc. as described herein for the various embodiments.

The sensors 126 can perform fiber break detection, which may be done locally by detecting good or valid power readings at the upstream switch out port or input to the degree fiber. Also, a Loss of Light (LOL) or a reading of no power at the downstream switch input port or output of the degree fiber may be detected.

The local controller 120 can be configured to detect a degree-to-degree fiber break event. Also, the local controller 120 is configured to switch all traffic from the faulted degree fiber to the protection fiber. Since both fiber pairs are dedicated for the same degree connections, they have no spectral contention while doing the local protection operation.

The processes of the local controller 120 may include switching, which may have no dependency on end-to-end communications over a channel path. The switching may also have no dependency on any LOCP or path computation element for further routing and spectrum assignment. Also, the switching processes may have no dependency on any other end-to-end controller solutions or network management systems (NMS). From the point of view of a LOCP (in L0 or a higher layer), the service route does not change and the service will appear as being un-interrupted. Only the active degree-to-degree fiber link will be different along the route.

The methods described herein provide protection between any given degrees for their express fiber connection. Although an extra port is burned on each degree, the methods prevent the need for an extra ROADM degree and line equipment for 1+1 protection. The method works for R&S ROADM architecture as well as for B&S ROADM architecture. Since the channel path remains the same, the issue of reserving spectrum slots on two paths may be irrelevant.

The fast local 1+1 switching for a given set of express spectrums can be achieved in a Wavelength Selective Switching (WSS) element in merely hundreds of milliseconds. The overall fiber break detection by the sensors 126 can take about a second in order to avoid any false positives. On a degree-to-degree fiber break, the complete protection can be practically achieved, for example, in a timeframe of about a second. This is primarily gated by the speed of fiber break detection of the sensors 126.

The 1+1 protection can be done for a given degree-to-degree connection to protect all express traffic or protect only selective high priority traffic (spectrum selective) coming from that degree. The 1+1 protection can be done for all degree-to-degree connections in a node. While provisioning express traffic over the protected degrees, the traffic can be added on one degree-to-degree link and leave the other one as protected, or traffic can be distributed over the protected links. In addition, not every degree fiber link needs to be protected. The systems and methods described herein allow specific degree fiber protection in a multi-degree connected ROADM node.

In the protection scheme of the present disclosure, the channels can be switched regardless of their permanent vs. mesh-restorable settings on their LOCP service provisioning level. That is, the protection criteria for switching any channel from one degree fiber to the other can be independent of their protection criteria set for an end-to-end path protection point of view, which can be done via an L0 control plane. The protection switching can be done unidirectionally based on the detection of a fiber break event. In other embodiments, the protection switching can be forced to be bi-directional.

In the embodiments of the present disclosure, it may be assumed that there is a communications connection between the two degrees. The local controller 120 can detect the fiber break events by reading the power values from two degrees. Then, the local controller 120 can dictate a primary (or home) switch location versus a protection switch location for the degrees. If the protected degrees can be part of the same shelf (i.e., same chassis), communication can take place over a backplane via a shelf processor. For example, the processing device 122 may be configured as the shelf processor in some embodiments. If the degrees are part of different chassis, a communication channel carrying the instructions from the control interface 128 may be used via a data connection such as over an optical service channel (OSC), a data communication network (DCN), etc. to establish the communication between different shelf processors.

The solution scheme can also be implemented in a disaggregated environment where there are no communications between the two degrees. This may be the case when the degrees are from different vendors. In such case, a higher layer controller (such as a Software-defined Networking (SDN) controller) can monitor degree power values, detect fiber break events, and trigger protection switches on individual degrees.

If there are no protection links available to protect against degree-to-degree link fault (e.g., if all protection links are broken), then notification can be sent to an end-to-end L0 control plane similar existing processes for mesh-restoration.

With the 1+1 protection scheme for degree fibers, the link budget for the working path remains unchanged unless there is an additional fiber pinch on the protection fiber, which may be a temporary fault condition (e.g., a double fault scenario). As long as the fiber patch loss between degrees remains more or less the same, the overall link budget over the working path remains uninterrupted.

Figure 8A:
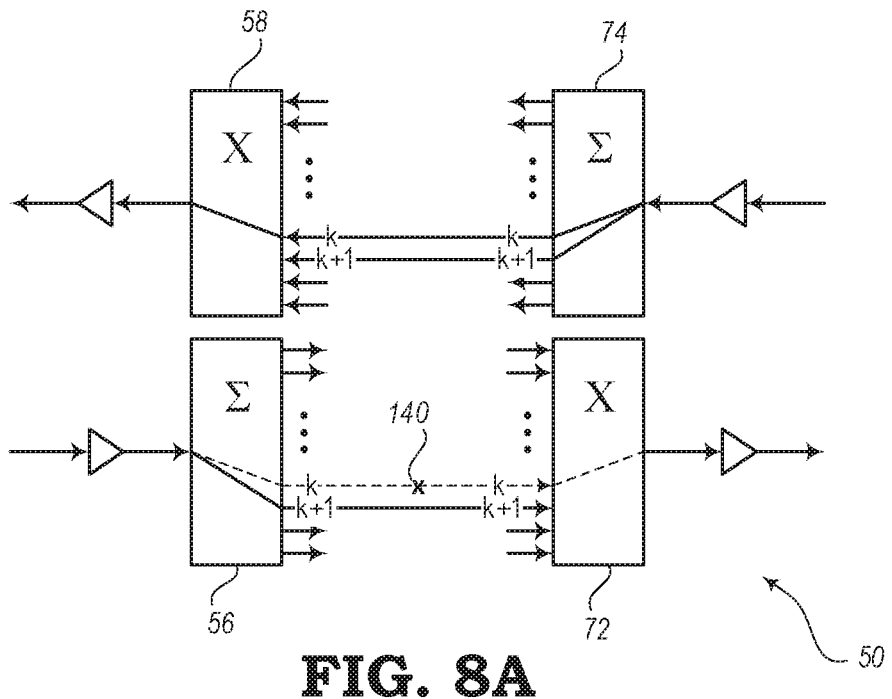
FIGS. 8A-8B are diagrams illustrating the node of FIG. 5 in which a fiber break is detected on a primary fiber path, whereby

In addition, the solution for a degree fiber protection works with or without L0 Control plane (no dependency). If the protected degrees are part of the same chassis, then a single control plane instance or node can monitor both degrees and their protected links. If they are part of different chassis, then each degree can be a control plane node, or both degrees can be consolidated to be a single control plane node. Therefore, the method for protection is not impacted by L0CP solutions or configurations running on top FIG. 8A shows the node 50 of FIG. 5 arranged with the B&S architecture with the OADM multiplexers 72, 58 configured to receive signals on a first port (e.g., port k), which may be the primary fiber pair as designated by the local controller 120. Again, the OADM demultiplexers 56, 74 are in a broadcast mode and therefore broadcast to both (or all) fiber pairs via the corresponding ports (e.g., ports k and k+1). As shown in FIG. 8A, a fiber break 140 is detected (e.g., by one of the sensors 126) on one of the fibers of the primary fiber pair corresponding to the k port. Therefore, the OADM multiplexer 72 on the east degree is unable to receive the signal.

Figure 8B:
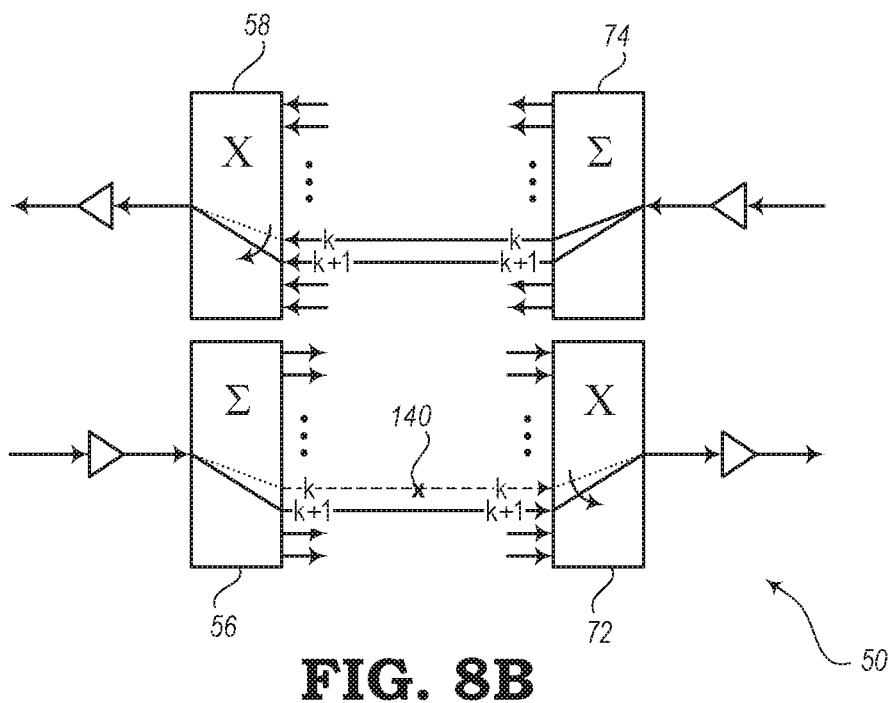

FIG. 8B shows the node 50 of FIG. 5, where the fiber break 140 is detected on the primary fiber pair as described with respect to FIG. 8A. As shown in FIG. 8B, the protection scheme is implemented to maintain degree-to-degree communication. Specifically, when the local controller 120 detects the fiber break 140 (or other fault in the primary fiber pair), as described with respect to FIG. 8A, the local controller 120 is configured to switch the OADM multiplexers 72, 58 from the primary port (e.g., port k) to the protection port (e.g., port k+1) to be able to receive signals along the protection fiber pair. Since the ports and fiber pairs are already configured between the respective ports of the opposing WSSs, the switching can be performed on one or both of the OADM multiplexers 72, 58 as needed to avoid the faulty fiber.

Figure 9A:
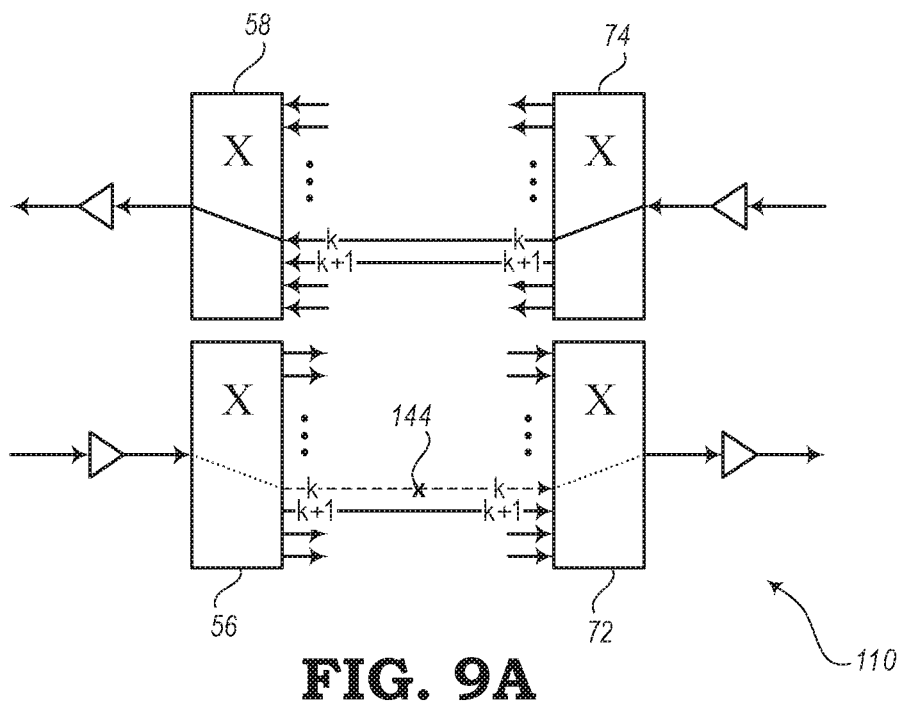
FIGS. 9A-9B are diagrams illustrating the node of FIG. 6 in which a fiber break is detected on a primary fiber path, whereby

FIG. 9A shows the node 110 of FIG. 6 arranged with the R&S architecture with the OADM demultiplexers 56, 74 and OADM multiplexers 72, 58 configured to communicate via their respective ports (e.g., port k) to enable signals to be transmitted and received via a primary fiber pair. Since the node 110 is arranged with the R&S structure, the demultiplexers and multiplexers are all switched to the one set of ports utilizing one fiber pair. In this example, the primary fiber pair corresponds to the k port of each of the WSS elements. Although the protection fiber pair corresponding to the k+1 ports are already configured between the two degrees, this fiber pair is originally unused, unless a fiber break is detected on the primary fiber pair. In this example, a fiber break 144 is detected (e.g., by one of the sensors 126) on at least one of the fibers of the primary fiber pair corresponding to the k port. Therefore, the OADM multiplexer 72 on the east degree is unable to receive the optical signals.

Figure 9B:
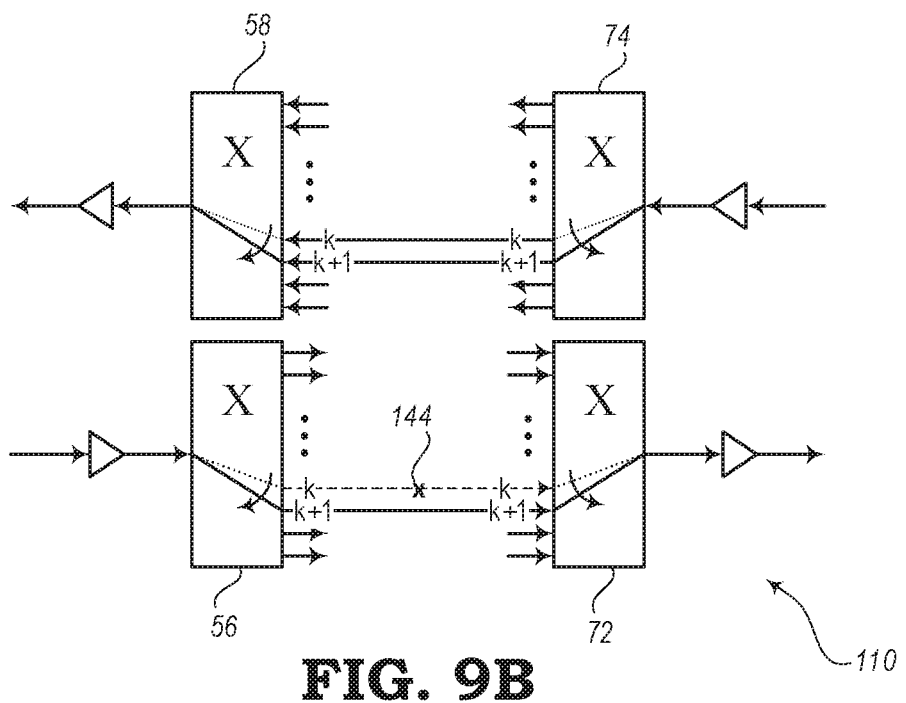

FIG. 9B shows the node 110 of FIG. 6, where the fiber break 144 is detected on the primary fiber pair. As shown in FIG. 9B, the protection scheme is implemented to maintain degree-to-degree communication. Specifically, when the local controller 120 detects a faulty primary fiber pair, as described with respect to FIG. 9A, the local controller 120 is configured to switch both the OADM demultiplexers 56, 74 and the OADM multiplexers 72, 58 from the primary port (e.g., port k) to the protection port (e.g., port k+1) to be able to receive signals along the protection fiber pair. Since the ports and fiber pairs are already configured between the respective ports of the opposing WSSs, the switching can be performed immediately to provide substantially instantaneous protection along the degree-to-degree route.

Figure 10:
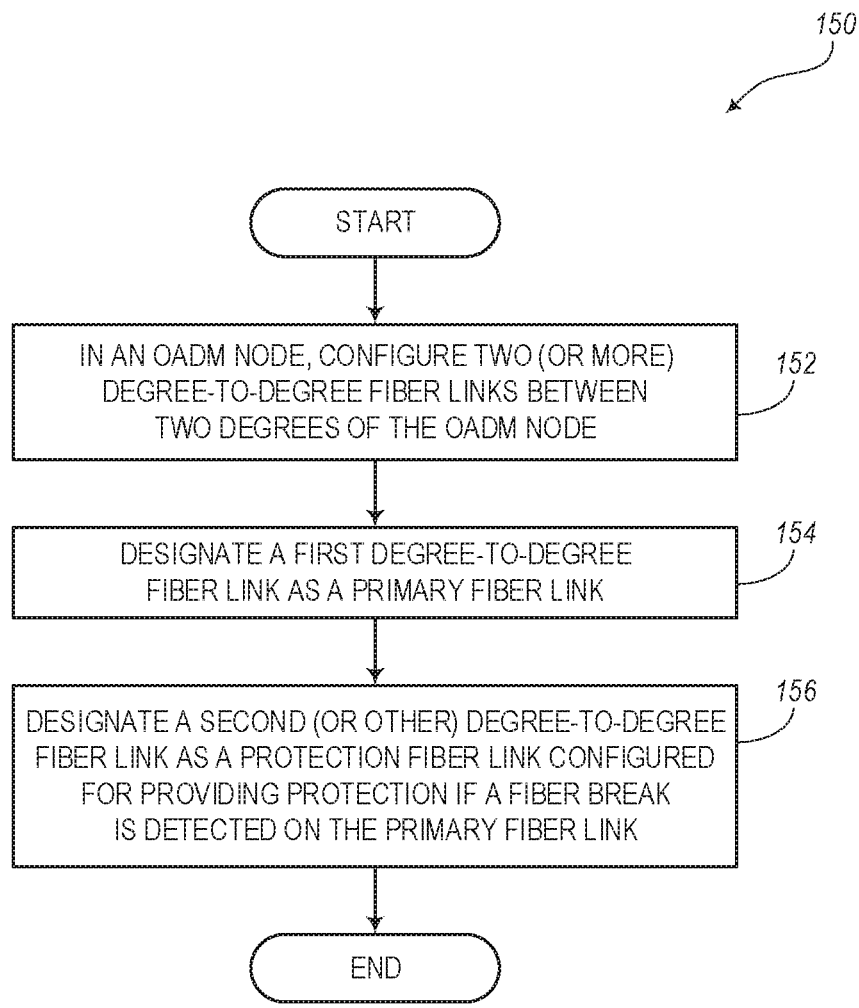
FIG. 10 is a flow diagram illustrating a method for configuring a node with multiple degree-to-degree fiber links, according to various embodiments of the present disclosure.

FIG. 10 is a flow diagram illustrating an embodiment of a method 150 for configuring an OADM node to enable degree-to-degree protection. The method 150 includes a step, as indicated in block 152, of configuring, in the OADM node, two (or more) degree-to-degree fiber links between two degrees of the OADM node. The step of configuring multiple degree-to-degree fiber links includes dedicating multiple fiber links for creating duplicate communication paths, such as for the purpose of allowing redundant transmission, as needed, of spectrum-selective channels that may be a high priority. As indicated in block 154, the method 150 further includes the step of designating a first degree-to-degree fiber link as a primary fiber link. As indicated in block 156, the method 150 further includes the step of designating a second (or additional) degree-to-degree fiber link as a protection fiber link (or additional protection fiber links) configured for providing protection if a fiber break is detected on the primary fiber link.

Figure 11:
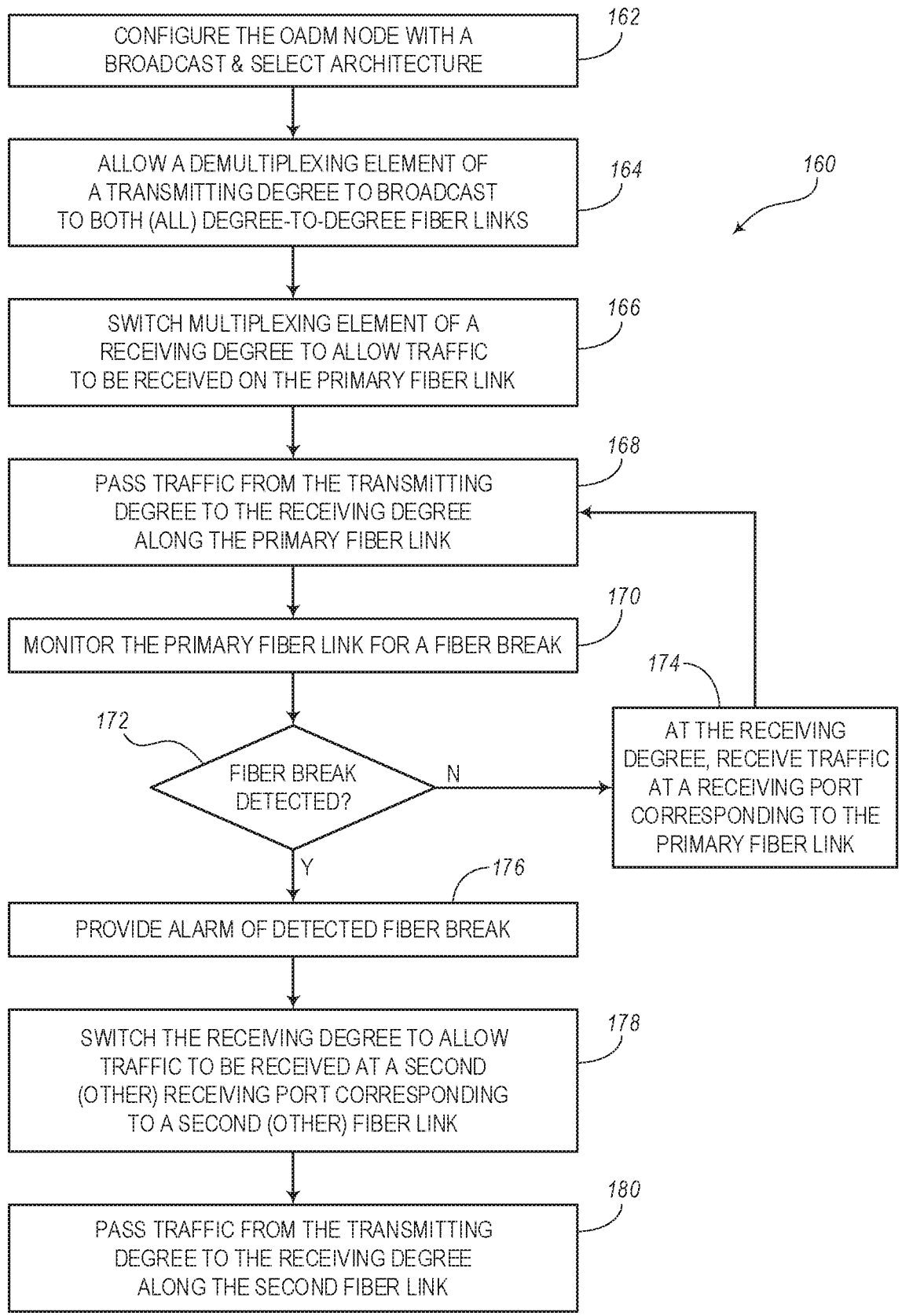
FIG. 11 is a flow diagram illustrating a method for controlling the node of FIG. 5 arranged with the B&S architecture, according to various embodiments.

FIG. 11 is flow diagram illustrating an embodiment of a method 160 for implementing an OADM node, as configured with duplicate fibers according to the method 150 of FIG. 10 or other similar methods for creating redundant links. In method 160, the OADM node is configured with a Broadcast & Select (B&S) architecture, as indicated in block 162. Method 160 further includes the step of switching a demultiplexing element of a transmitting degree to allow traffic to be passed along both (or all) degree-to-degree fiber links, as indicated in block 164. In block 166, the method 160 includes switching a multiplexing element of a receiving degree to allow traffic to be received on the primary fiber link. Then, the traffic can be passed from the transmitting degree to the receiving degree along the primary fiber link, as indicated in block 168.

When traffic is passed along the primary fiber link, the method 160 further includes the step of monitoring the primary fiber link to detect for any fault, such as a fiber break, as indicated in block 170. In decision diamond 172, the method 160 includes the step of determining if a fiber break (or other type of fault) has been detected. If not, then the OADM node can continue to pass traffic along the primary path, whereby the method 160 further includes the step, as indicated in block 174, of receiving, at the receiving degree, traffic at a receiving port corresponding to the primary fiber link. Then, the method 160 can return back to block 168, allowing additional traffic to be passed from the transmitting degree to the receiving degree along the primary fiber link, as long as there are no fiber breaks on the primary fiber link.

However, if it is determined in decision diamond 172 that a fiber break is detected, the method 160 proceeds to block 176, which indicates that an alarm can be provided to warn a network operator that the fiber break has been detected. Hence, the network operator can then take necessary actions, such as attempting to manually repair the broken fiber and restore traffic along the primary path. This step (i.e., block 176) may be optional in the method 160 and may be omitted in some cases, such as when the method 160 is intended to be conducted with automatic control without human intervention. Nevertheless, at this point, the method 160 proceeds to block 178, which indicates that the receiving degree is switched away from the faulty primary fiber to allow traffic to be received at a second (or another) receiving port corresponding to a second (or another) fiber link. The signals, which have been broadcasted by the transmitting degree along multiple fibers in the B&S structure, can then be received on another selected fiber. The method 160 then includes the step of passing traffic from the transmitting degree to the receiving degree along the second (or other) fiber link, as indicated in block 180. Block 180 may be repeated as necessary until a primary fiber link is replaced, repaired, or restored.

Figure 12:
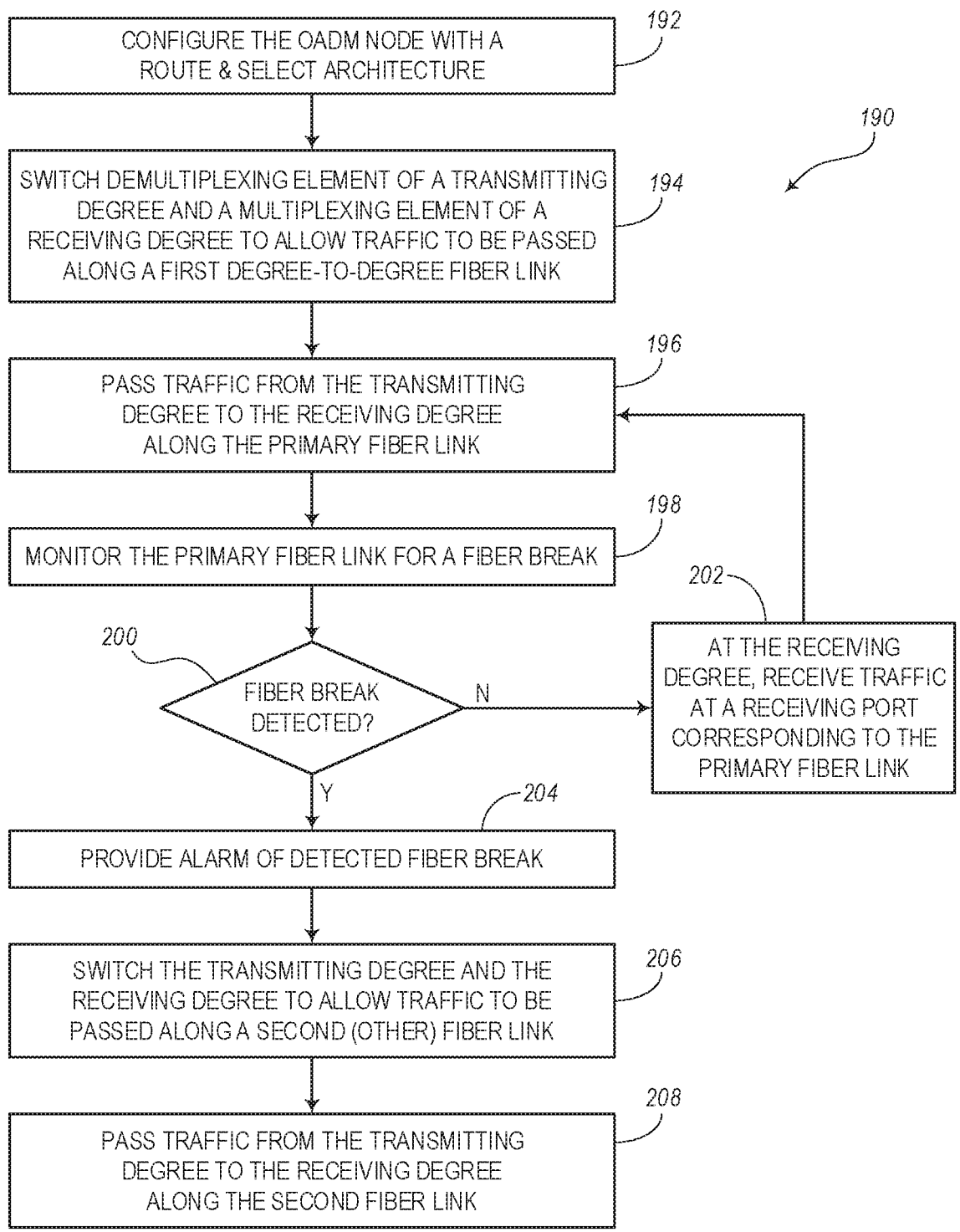
FIG. 12 is a flow diagram illustrating a method for controlling the node of FIG. 6 arranged with the R&S architecture, according to various embodiments.

FIG. 12 is flow diagram illustrating an embodiment of a method 190 for implementing an OADM node, as configured with duplicate fibers according to the method 150 of FIG. 10 or other similar methods. In method 190, the OADM node is configured with a Route & Select (R&S) architecture, as indicated in block 192, which is structured differently than the B&S structure (as described with respect to the method 160 of FIG. 11). Method 190 further includes the step of switching both a demultiplexing element of a transmitting degree and a multiplexing element of a receiving degree to allow traffic to be passed along a first degree-to-degree fiber link, as indicated in block 194. This first degree-to-degree fiber link may be designated as a primary fiber link. Then, the traffic can be passed from the transmitting degree to the receiving degree along the primary fiber link, as indicated in block 196.

When traffic is passed along the primary fiber link, the method 190 further includes the step of monitoring the primary fiber link to detect for any fault, such as a fiber break, as indicated in block 198. In decision diamond 200, the method 190 includes the step of determining if a fiber break (or other type of fault) has been detected. If no fiber break is detected, then the OADM node can continue to pass traffic along the primary path. Thus, the method 190 may include the step, as indicated in block 202, of receiving, at the receiving port of a receiving degree, traffic corresponding to the primary fiber link. Then, the method 190 can return back to block 196, allowing additional traffic to be passed from the transmitting degree to the receiving degree along the primary fiber link, as long as there are no fiber breaks on the primary fiber link.

However, if it is determined in decision diamond 200 that a fiber break is detected, the method 190 proceeds to block 204, which indicates an optional step in which an alarm can be provided to warn a network operator that the fiber break has been detected in order that necessary actions can be taken to attempt to manually repair the broken fiber or restore traffic along the primary path. The method 190 proceeds to block 206, which indicates that both the transmitting degree and the receiving degree are switched away from the faulty primary fiber to allow traffic to be passed along a second (or another) fiber link. In the R&S structure, the transmitting degree only transmits on one fiber at a time and the receiving degree only receives on that one fiber. According to block 206, both the transmitting degree and receiving degree can select another fiber (already configured as a protective fiber as described with respect to the method 150 of FIG. 10). The transmitting degree and receiving degree are switched simultaneously to the selected protective fiber so that the signals can be passed on this other fiber when a break is detected on the primary fiber. Once switched, the method 190 then includes the step of passing traffic from the transmitting degree to the receiving degree along the second (or other) fiber link, as indicated in block 208. This alternate path may be used as long as necessary until the primary fiber link is restored or the fiber break is repaired.

Figure 13:
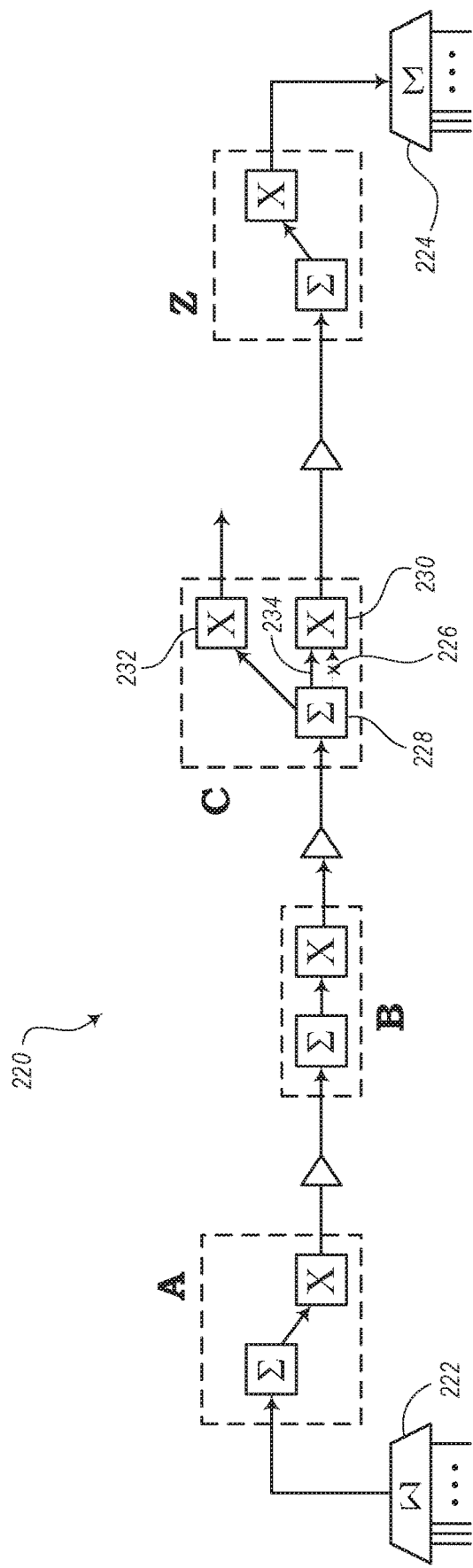
FIG. 13 is a schematic diagram illustrating an optical network in which at least one node is configured with degree-to-degree protection, according to various embodiments of the present disclosure.

FIG. 13 is a schematic diagram illustrating a portion of an optical network 220 including multiple nodes (e.g., OADM nodes). Although protected paths may be established, as is described with respect to the conventional systems of FIGS. 1-4, only the primary path is shown in FIG. 13. The primary path in this example of the optical network 220 includes OADM devices for routing traffic from a multiplexing element of a source node 222 to a demultiplexing element of a destination node 224. The traffic is routed through nodes A, B, C, and Z between the source node 22 and the destination node 224. However, instead of re-routing traffic through alternate nodes along alternate paths from the source to the destination, the optical network 220 allows the implementation of the systems and methods of the present disclosure to provide degree-to-degree protection within each node.

For example, if a fault 226 (e.g., fiber break) is detected between a demultiplexing element 228 of a transmitting degree of node C and a multiplexing element 230 of a receiving degree of node C, the node C does not need to resort to re-routing traffic to another degree. In other words, the demultiplexing element 228 does not need to re-route to another multiplexing element, such as multiplexing element 232, at another degree of the node C (e.g., according to traditional path protection schemes), but the demultiplexing element 228 may simply utilize a redundant or protection fiber link 234 that has been configured between the respective ports of the elements 228, 230 of node C as described in detail above. In this way, the fiber link 234 can be used for protection, as described throughout the present disclosure, without relying on an end-to-end path protection re-routing scheme. Also, switch control for switching from a primary fiber within the node to a protection fiber can be enacted by a local controller (e.g., local controller 120 of FIG. 7) for controlling the alternate fiber paths within the single node.

As a result of the implementations of the systems and methods of the present disclosure, certain benefits can be realized. For example, the system may be a completely localized solution that can run in the node level between two degrees, which can eliminate the need for end-to-end communications. The selective spectrum protection can be achieved with a local 1+1 configuration or a local 1:1 configuration. Also, faulted channels can be restored, which may be affected by a degree fiber break. Steady-state offsets on the other in-service channels, which may be coming from other degrees or locally added downstream to the fault, can be restored in a matter of seconds.

Implementation of the systems and methods of the present disclosure results in various improvements over conventional systems. For example, conventional systems may delete faulted channels and restore them on a different path. Also, conventional systems typically rely on an end-to-end controller (e.g., a software-based solution) or an ASE-based channel holder mechanism (e.g., a hardware-based solution) to recover the steady-state offsets on downstream in-service channels.

Another advantage of the embodiments of the present disclosure is that link budget benefits can be preserved for the primary working path. Although the present embodiments require the burning of an extra port on the WSS for each degree to configure the 1+1 protection, dedicating an extra port for express traffic on a WSS with a high port count (e.g., more than 20 switch ports), losing one port may not normally be an issue.

It may be noted that a degree-to-degree fiber break affects only a subset of channels coming to an OMS, compared to a span fiber cut that affects all channels running on an OMS. This is why, handling a degree fiber break is complicated for an end to end control plane until each degree fiber connections in the network are modeled as explicit "links." The proposed method hides that complexity of modeling internal degree to degree fiber connections from an end to end layer 0 or higher layer control plane Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A local controller configured to provide control signals to an Optical Add/Drop Multiplexer (OADM) node, the local controller comprising:
   a processing device, and
   a memory device configured to store a local switch control module including logic instructions which, when executed, cause the processing device to
      configure a plurality of degree-to-degree fiber links between a first degree of the OADM node and a second degree of the OADM node,
      designate a first degree-to-degree fiber link of the plurality of degree-to-degree fiber links as a primary fiber link,
      designate at least a second degree-to-degree fiber link of the plurality of degree-to-degree fiber links as one or more protection fiber links configured for providing protection if a fiber break is detected on the primary fiber link,
      configure the OADM node with a Route and Select (R&S) architecture,
      switch a demultiplexing element of a transmitting degree of the OADM node to initially allow traffic to be passed along the primary fiber link if no fiber break is detected on the primary fiber link and to secondarily pass traffic along one of the one or more protection fiber links if a fiber break is detected on the primary fiber link, and
      switch a multiplexing element of a receiving degree of the OADM node to initially select the primary fiber link for receiving the traffic if no fiber break is detected on the primary fiber link and to secondarily select the one protection fiber link for receiving the traffic if a fiber break is detected on the primary fiber link.

2. The local controller of claim 1, wherein the local switch control module runs on top of an end-to-end path protection scheme utilized in an optical network in which the OADM node resides.

3. The local controller of claim 1, wherein each degree-to-degree fiber link includes a fiber pair for bi-directional communication between the first degree and the second degree.

4. The local controller of claim 1, wherein the OADM node includes at least a third degree that does not require degree fiber protection.

5. The local controller of claim 1, wherein, since no change takes place from the point of view of an end-to-end path, the local controller works independently of any Layer 0 control plane solution.

6. The local controller of claim 1, wherein the logic instructions, when executed, further cause the processing device to detect the fiber break by detecting a loss of signal on an input of a receiving degree when a valid power level is detected on an output of a transmitting degree.

7. A local controller configured to provide control signals to an Optical Add/Drop Multiplexer (OADM) node, the local controller comprising:
   a processing device, and
   a memory device configured to store a local switch control module including logic instructions which, when executed, cause the processing device to
      configure a plurality of degree-to-degree fiber links between a first degree of the OADM node and a second degree of the OADM node,
      designate a first degree-to-degree fiber link of the plurality of degree-to-degree fiber links as a primary fiber link,
      designate at least a second degree-to-degree fiber link of the plurality of degree-to-degree fiber links as one or more protection fiber links configured for providing protection if a fiber break is detected on the primary fiber link, and
      configure the plurality of degree-to-degree fiber links by configuring the fiber links as a plurality of redundant links using multiple ports at each of the first degree and second degree,
      wherein traffic between the first degree and the second degree is distributed over the plurality of redundant links or over the primary fiber link.

8. The local controller of claim 7, wherein the logic instructions further cause the processing device to configure the OADM node with a Broadcast and Select (B&S) architecture, allow a demultiplexing element of a transmitting degree of the OADM node to broadcast traffic to the plurality of degree-to-degree fiber links, and switch a multiplexing element of a receiving degree of the OADM node to initially select the primary fiber link for receiving the traffic and to secondarily select one of the one or more protection fiber links if a fiber break is detected on the primary fiber link.

9. The local controller of claim 7, wherein the local switch control module runs on top of an end-to-end path protection scheme utilized in an optical network in which the OADM node resides.

10. The local controller of claim 7, wherein the logic instructions further cause the processing device to utilize the one or more protection fiber links to protect a selective spectrum for a given fiber corresponding to a specific part of a spectrum.

11. The local controller of claim 7, wherein each degree-to-degree fiber link includes a fiber pair for bi-directional communication between the first degree and the second degree.

12. The local controller of claim 7, wherein the OADM node includes at least a third degree that does not require degree fiber protection.

13. The local controller of claim 7, wherein, since no change takes place from the point of view of an end-to-end path, the local controller works independently of any Layer 0 control plane solution.

14. The local controller of claim 7, wherein the logic instructions, when executed, further cause the processing device to detect the fiber break by detecting a loss of signal on an input of a receiving degree when a valid power level is detected on an output of a transmitting degree.

15. A local controller configured to provide control signals to an Optical Add/Drop Multiplexer (OADM) node, the local controller comprising:

a processing device, and a memory device configured to store a local switch control module including logic instructions which, when executed, cause the processing device to configure a plurality of degree-to-degree fiber links between a first degree of the OADM node and a second degree of the OADM node, designate a first degree-to-degree fiber link of the plurality of degree-to-degree fiber links as a primary fiber link, designate at least a second degree-to-degree fiber link of the plurality of degree-to-degree fiber links as one or more protection fiber links configured for providing protection if a fiber break is detected on the primary fiber link, and utilize the one or more protection fiber links to protect a selective spectrum for a given fiber corresponding to a specific part of a spectrum.

16. The local controller of claim 15, wherein the logic instructions further cause the processing device to configure the OADM node with a Broadcast and Select (B&S) architecture, allow a demultiplexing element of a transmitting degree of the OADM node to broadcast traffic to the plurality of degree-to-degree fiber links, and switch a multiplexing element of a receiving degree of the OADM node to initially select the primary fiber link for receiving the traffic and to secondarily select one of the one or more protection fiber links if a fiber break is detected on the primary fiber link.

17. The local controller of claim 15, wherein the local switch control module runs on top of an end-to-end path protection scheme utilized in an optical network in which the OADM node resides.

18. The local controller of claim 15, wherein each degree-to-degree fiber link includes a fiber pair for bi-directional communication between the first degree and the second degree.

19. The local controller of claim 15, wherein the OADM node includes at least a third degree that does not require degree fiber protection.

20. The local controller of claim 15, wherein, since no change takes place from the point of view of an end-to-end path, the local controller works independently of any Layer 0 control plane solution.

* * * * *